(12) United States Patent
Haddadi et al.

(10) Patent No.: US 12,138,559 B2
(45) Date of Patent: Nov. 12, 2024

(54) SYSTEM AND METHOD FOR CONTROLLING A FLYING TOY

(71) Applicant: Spin Master Ltd., Toronto (CA)

(72) Inventors: Amir Haddadi, Toronto (CA); Lee Lawrence Gamble, Toronto (CA)

(73) Assignee: Spin Master Ltd., Ontario (CA)

( * ) Notice: Subject to any disclaimer, the term of this patent is extended or adjusted under 35 U.S.C. 154(b) by 214 days.

(21) Appl. No.: 17/197,623

(22) Filed: Mar. 10, 2021

(65) Prior Publication Data

US 2021/0283521 A1 Sep. 16, 2021

Related U.S. Application Data

(60) Provisional application No. 62/988,063, filed on Mar. 11, 2020.

(51) Int. Cl.
*A63H 30/04* (2006.01)
*A63H 29/24* (2006.01)
*G01S 13/88* (2006.01)
*A63H 27/00* (2006.01)

(52) U.S. Cl.
CPC ............. *A63H 30/04* (2013.01); *A63H 29/24* (2013.01); *A63H 27/12* (2013.01); *G01S 13/881* (2013.01); *G01S 13/882* (2013.01)

(58) Field of Classification Search
CPC .................................................. G01S 13/881
See application file for complete search history.

(56) References Cited

U.S. PATENT DOCUMENTS

| | | | |
|---|---|---|---|
| 333,085 | A | 1/1886 | Roush et al. |
| 2,256,918 | A | 9/1941 | Young |
| 2,344,266 | A | 3/1944 | Reissner |
| 2,379,496 | A | 7/1945 | Saunier, Jr. |
| 2,382,431 | A | 8/1945 | Loth et al. |
| 2,650,046 | A | 8/1953 | Vanderlip |
| 2,873,075 | A | 2/1959 | Mooers et al. |
| 2,957,687 | A | 10/1960 | Chillson et al. |
| 3,093,807 | A | 6/1963 | Crane et al. |

(Continued)

FOREIGN PATENT DOCUMENTS

CA 2804810 A1 4/2013
CN 209662620 U * 11/2019 ............ A63H 27/00

(Continued)

OTHER PUBLICATIONS

Rud Merriam, Flying With Proportional—Integral—Derivative Control, 2016, hackaday.com (Year: 2016).*

(Continued)

*Primary Examiner* — Bernarr E Gregory
*Assistant Examiner* — Juliana Cross
(74) *Attorney, Agent, or Firm* — Aird & McBurney LP

(57) ABSTRACT

A system and method for controlling a flying toy is shown and described herein. The flying toy may transmit a signal and receive a return signal after the signal reflects off of a surface. The return signal may be compared to the transmitted signal to determine information indicative of an error between the transmitted signal and the return signal. A control signal may be sent to a motor to control the speed of the motor based on the information indicative of the error. The motor may operate a propeller to control the distance between the flying toy and the surface.

19 Claims, 8 Drawing Sheets

(56) References Cited

U.S. PATENT DOCUMENTS

| | | | |
|---|---|---|---|
| 3,102,263 | A | 8/1963 | Meyer |
| 3,375,518 | A | 3/1968 | Mader et al. |
| 4,664,340 | A | 5/1987 | Jackson |
| 5,195,039 | A | 3/1993 | Gold et al. |
| 5,371,581 | A | 12/1994 | Wangler et al. |
| 5,634,839 | A | 6/1997 | Dixon |
| 5,933,224 | A | 8/1999 | Hines et al. |
| 6,075,479 | A | 6/2000 | Kudoh |
| 6,260,796 | B1 | 7/2001 | Klingensmith |
| 7,100,866 | B2 | 9/2006 | Rehkemper et al. |
| 8,204,515 | B2 * | 6/2012 | Dishongh ............ G01S 5/02524 455/456.6 |
| 2014/0139848 | A1 * | 5/2014 | Kanzawa ............... B41J 19/202 358/1.5 |
| 2014/0227932 | A1 * | 8/2014 | Sullivan ................. A63H 27/12 446/37 |
| 2019/0051007 | A1 * | 2/2019 | Pohl ......................... G08G 5/04 |
| 2019/0086509 | A1 * | 3/2019 | Bilik ....................... G01S 13/87 |
| 2019/0293769 | A1 * | 9/2019 | Subasingha ............. G01S 17/02 |
| 2019/0387152 | A1 | 12/2019 | Sivan |
| 2020/0061480 | A1 | 2/2020 | Rehkemper et al. |

FOREIGN PATENT DOCUMENTS

| | | | |
|---|---|---|---|
| JP | H05285276 | A | 11/1993 |
| JP | H08010451 | A | 1/1996 |
| JP | H11231052 | A | 8/1999 |
| JP | 2000218063 | A | 8/2000 |
| JP | 2010032267 | A | 2/2010 |
| JP | 2014064914 | A | 4/2014 |
| JP | 2017228917 | A * | 12/2017 |
| JP | 2020511358 | A | 4/2020 |
| KR | 100969879 | B1 | 7/2010 |
| WO | 9012330 | A | 10/1990 |
| WO | 2016121008 | A1 | 8/2016 |
| WO | 2018170739 | A1 | 9/2018 |

OTHER PUBLICATIONS

Rud, Merriam, "Flying with Proportional Integral-Derivative Control," https://hackaday.com/2016/05/18/flying-with-proportional-integral-derivative-control/, Blog, May 18, 2016.
PCT Patent Application PCT/IB2021/052057 International Search Report and Written Opinion dated May 14, 2021.
EP 21767537.0, Extended European Search Report, Jul. 19, 2022, European Patent Office.
Khawaja Wahab et al., "A Survey of Air-to-Ground Propagation Channel Modeling for Unmanned Aerial Vehicles", IEEE Communications Surveys & Tutorials, vol. 21, No. 3, Aug. 22, 2019, pp. 2361-2391.
JP2017228917A English machine translation.
Perlin, Joel P., et al."Senior Capstone Design Experience: Hovering Robot," Department of Electrical Engineering United States Air Force Academy, Co., Session 2793, American Society for Engineering Education, 2003.
Sankar, K.S., "Infrared Proximity Detector," Nov. 5, 2017.
Schreiber, Robert, "Implementing Ultrasonic Ranging AN597," Microchip Technology, Inc., 1997.
Acuity Research, "AccuRange 4000TM Laser Rangefinder With Measurement Capabilities to 54 Feet," Instrumentation Devices Srl, 2003.
Bonekamp, H., "Parking Sonar Range Monitor to Make Parking Safer," Elektor Electronics, Apr. 1998.
Williams, AI, "Basic Stamp Programming Course (4); Part 4 Obstacle Alley," Elektor Electronics, Dec. 1999.
Elektor Electronics PVT, Ltd., "Infra-Ref Light Gate," vol. 5, No. 8, pp. 46-49, Aug. 1987.
Pijpers, L., "Mini Robot Car," Elektor Electronics, Jul./Aug. 1995.
Elektor Electronics, Test & Measurement, "Distance Measurement Using Infrared With a New Proximity Sensor Module," Jul./Aug. 2002.
Kim, Nakwan, et al, "Adaptive Output Feedback for Altitude Control of an Unmanned Helicopter Using Rotor RPM," AIAA Guidance, Navigation, and Control Conference and Exhibit, Aug. 16-19, 2004.
Japanese Patent Office, Notice of Reasons for Rejection in Japanese Patent Application 2022-517757, dated Nov. 1, 2022.
English translation of JP2020511358.
Japan Patent Office, Notice of Reasons for Rejection in Japanese patent application No. JP 2022-517757, dated Aug. 29, 2023, with English Translation.
Japanese Patent Office, Notice of Reasons for Rejection in Japanese Patent Application 2022-517757, dated Apr. 4, 2023, with English Translation.
European Patent Office, Examination Report (Communication pursuant to Art. 94(3) EPC with Annex), in European Patent Application 21767537.0, dated Apr. 20, 2023.
European Patent Office, Communication pursuant to Article 94(3) EPC in European patent application No. EP21767537.0, Nov. 21, 2023.
Tsubouchi Ket Al: "An Asynchronous Spread Spectrum Wireless-Modem Using a Saw Convolver", Proceedings of the Ultrasonics Symposium. Chicago, Oct. 2-5, 1988, Proceedings of the Ultrasonics Symposium, New York, IEEE, US, vol. 1, Oct. 2, 1988, pp. 213-218, XP000076956.
Japan Patent Office, Decision to Grant Patent in Japanese patent application No. JP 2022-517757, dated May 28, 2024, with English Translation.

* cited by examiner

RX at Distance 3
Worst Case

Calculated Score: RX vs. TX = 5/15=33%

530

SYSTEM AND METHOD FOR CONTROLLING A FLYING TOY

RELATED APPLICATION

This non-provisional patent application claims priority benefit, with regard to all common subject matter, of earlier-filed U.S. Provisional Patent Application No. 62/988,063, filed Mar. 11, 2020, and entitled SYSTEM AND METHOD FOR CONTROLLING A FLYING TOY. The identified earlier-filed provisional patent application is hereby incorporated by reference in its entirety into the present application.

BACKGROUND

1. Field

Embodiments of the invention relate to controlling a flying toy. More specifically, embodiments of the invention relate to controlling a flying toy based on a detected height of the flying toy.

2. Related Art

Typical systems and methods for controlling flying toys utilize propellers powered by electric motors. In some prior art systems, a signal is transmitted from a transmitter on the toy, which reflects off of a surface (e.g., the ground or a substrate below the flying toy), then returns to a receiver on the toy. The motor is controlled based on the signal either being detected or not being detected. A first speed of the motor is set when the signal is received, or is received for a period of time, and a second speed of the motor is set when the signal is not received, or not received for a period of time. The first speed results in the toy increasing the distance to the surface (i.e., gaining height relative to the surface), and the second speed results in the toy decreasing the distance to the surface (i.e., losing height relative to the surface). The first speed is set just above a speed that causes the toy to hover. The second speed is set just below a speed that causes the toy to hover. Upon startup, the initial speed of the motor is the first speed, such that the toy gains height to achieve a height above the surface. In some toys, the height is a predetermined distance or range of distance above the surface. The controller cycles between the first speed and the second speed as the signal is received and not received to effectuate the toy maintaining the predetermined distance (or range of distance) above the surface. This is a limited bi-state system that is reliant on either receiving the signal or not receiving the signal.

Further, some prior systems have a hover setting. When a signal is received, or not received, for an amount of time, the toy will enter a hover mode for a period of time and change when the signal state changes.

Systems as described above have many drawbacks. The prior art systems are limited to the bi-state control of receiving a signal or not receiving the signal. The systems are not capable of higher level, more robust control with, for example, a Proportional Integral Derivative (PID) controller. There is no error detection in the system, so the control is extremely limited. Further, the prior art systems utilize Infrared (IR) signals. This is also limiting because it is susceptible to environmental conditions. The reflected signal is dependent on the surface from which the signal is reflecting. For example, a smooth shiny surface, such as a tabletop, may reflect more efficiently than a rough dark surface, such as a dark-colored carpet. The reliance on a reflected IR signal and bi-state control make the prior art systems extremely limited.

Accordingly, what is needed is a system that controls a flying toy based on information gained from the received signal rather than simply a bi-state system based on either receiving a signal or not receiving a signal. Basing the flight control on a determined distance between the flying toy and the surface provides a more robust system and a more efficiently controlled flying toy.

SUMMARY

Embodiments of the invention address the above-described need by providing for a variety of systems and methods for improving flying toys. In some embodiments, the toy utilizes a reflected analog signal transmitted from the toy. A distance of the toy above a surface may be determined from a duration of a return signal compared to the duration of the transmitted signal or a time-of-flight of the transmitted signal. In other embodiments, the toy utilizes a reflected digital signal transmitted from the flying toy. A bit error rate may be determined by comparing the transmitted signal and the received signal. The flight of the flying toy may be controlled based on the bit error rate. These systems are more efficient and more robust than the limited bi-state receive/not receive systems described above. And, in the case of an analog signal, if the signal is lost, the state of the control signal is maintained until power is lost or the signal is regained.

In particular, a first embodiment of the invention is directed to a method of controlling a flying toy based on a distance between the flying toy and a surface, the method comprising the steps of transmitting a signal from a transmitter at the flying toy, receiving the signal at a receiver of the flying toy after the signal has reflected off of the surface, comparing the received signal with the transmitted signal, determining a bit error rate between the transmitted signal and the received signal, and sending a control signal to a motor to control flight of the flying toy, wherein the control signal is based at least in part on the bit error rate.

A second embodiment of the invention is directed to a flying toy control system for controlling a distance between a flying toy and a surface, comprising a transmitter transmitting a signal from the flying toy, a receiver receiving the signal at the flying toy after the signal has reflected off of the surface, and one or more non-transitory computer-readable media storing computer-executable instruction that, when executed by at least one processor, perform a method of controlling the flying toy at a distance from the surface, the method comprising the steps of comparing the received signal with the transmitted signal, determining a bit error rate between the transmitted signal and the received signal, and sending a control signal to a motor to control flight of the flying toy, wherein the control signal is based at least in part on the bit error rate.

A third embodiment of the invention is directed to one or more non-transitory computer-readable media storing computer-executable instructions that, when executed by at least one processor, perform a method of controlling a flying toy based on a distance between the flying toy and a surface, the method comprising the steps of transmitting a signal from a transmitter at the flying toy, receiving the signal at a receiver of the flying toy after the signal has reflected off of the surface, determining a bit error rate between the transmitted signal and the received signal, sending a first control signal to a motor to control flight of the flying toy when the bit error rate is above a threshold, and sending a second control signal to the motor when the bit error rate is below the threshold.

A fourth embodiment of the invention is directed to a method of controlling a flying toy based on a distance between the flying toy and a surface, the method comprising the steps of transmitting a signal from a transmitter at the flying toy, receiving the signal at a receiver of the flying toy after the signal has reflected off of the surface, comparing the received signal with the transmitted signal, determining a bit error rate between the transmitted signal and the received signal, comparing the bit error rate to a threshold value, and sending a control signal to a motor to control flight of the flying toy, wherein the control signal is based at least in part on the bit error rate and the comparison of the bit error rate to the threshold value.

A fifth embodiment of the invention is directed to one or more a method of controlling a flying toy based on a height of the flying toy over a surface, the method comprising the steps of transmitting a signal from a transmitter at the flying toy, receiving the signal at a receiver of the flying toy after the signal has reflected off of the surface, comparing the received signal with the transmitted signal, conditioning the received signal by performing a moving average on a plurality of samples of the received signal, determining a bit error rate between the transmitted signal and the conditioned signal, comparing the bit error rate to a threshold value, and sending a control signal to a motor to control flight of the flying toy, wherein the control signal is based at least in part on the bit error rate, the comparison of the bit error rate to the threshold value, and the conditioned signal.

A sixth embodiment of the invention is direct to one or more non-transitory computer-readable media storing computer-executable instruction that, when executed by at least one processor, perform a method of controlling a flying toy based on a height of the flying toy over a surface, the method comprising the steps of transmitting a signal from a transmitter at the flying toy, receiving the signal at a receiver of the flying toy after the signal has reflected off of the surface, comparing the received signal with the transmitted signal, conditioning the received signal by performing a moving average on a plurality of samples of the received signal, determining a bit error rate between the transmitted signal and the conditioned signal, comparing the bit error rate to a threshold value, and sending a control signal to a motor to control flight of the flying toy, wherein the control signal is based at least in part on the bit error rate, the comparison of the bit error rate to the threshold value, and the conditioned signal.

A seventh embodiment of the invention is directed to a flying toy control system for controlling a distance between a flying toy and a surface, the system comprising a transmitter transmitting a signal from the flying toy, a receiver receiving the signal at the flying toy after the signal has reflected off of the surface, and one or more non-transitory computer-readable media storing computer-executable instruction that, when executed by at least one processor, perform a method of controlling the flying toy based on a height of the flying toy over the surface, the method comprising the steps of comparing the received signal with the transmitted signal, conditioning the received signal by performing a moving average on a plurality of samples of the received signal, determining a bit error rate between the transmitted signal and the conditioned signal, comparing the bit error rate to a threshold value, and sending a control signal to a motor to control flight of the flying toy, wherein the control signal is based at least in part on the bit error rate, the comparison of the bit error rate to the threshold value, and the conditioned signal.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 6:
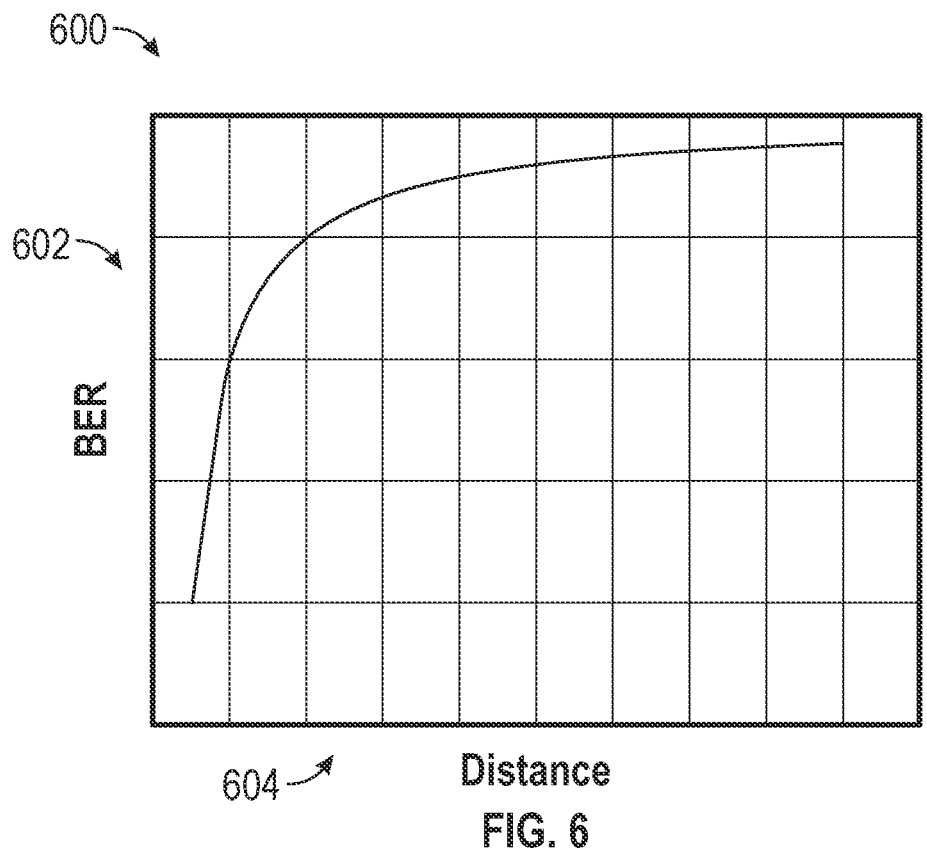
Figure 7A:
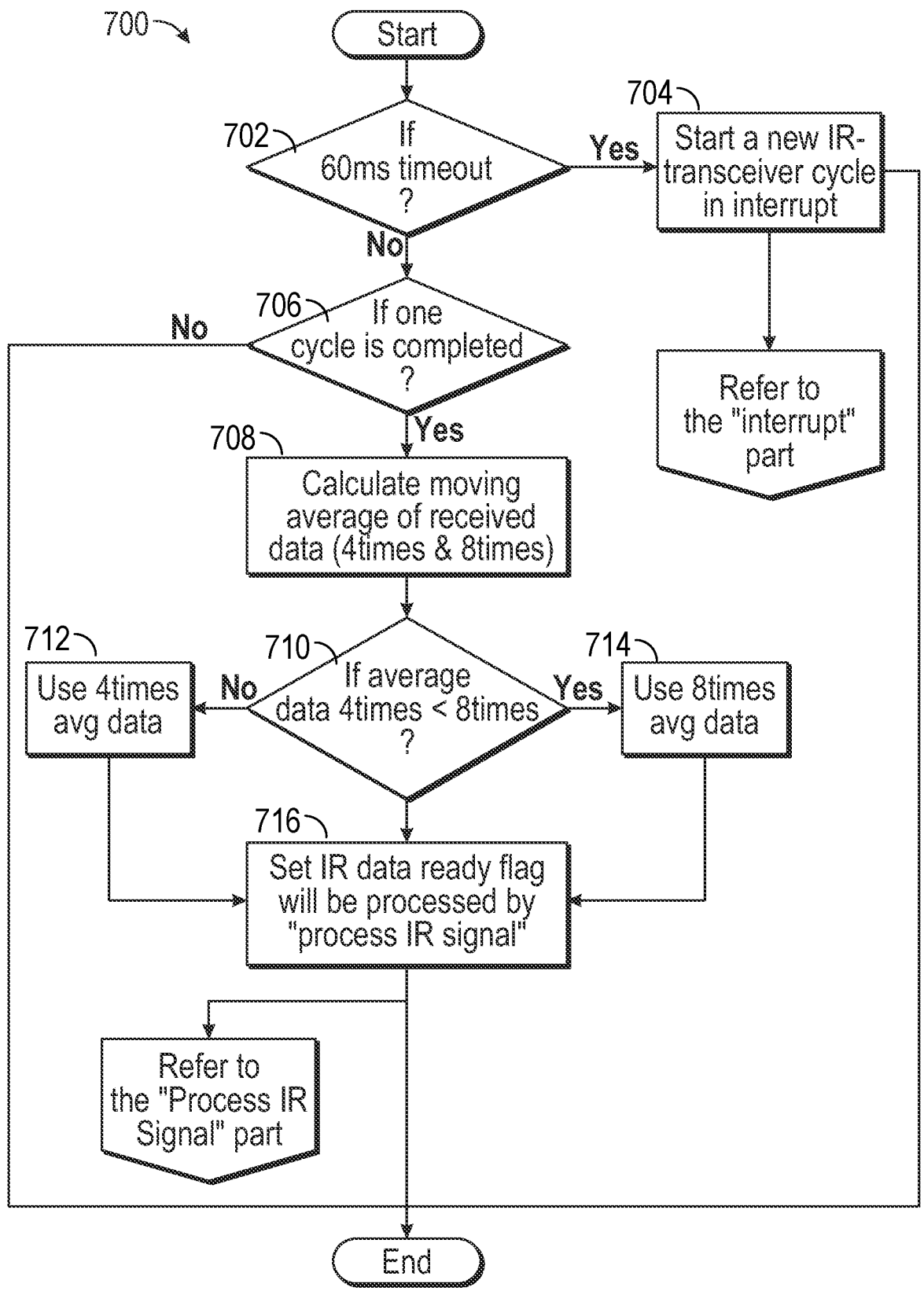
Figure 7B:
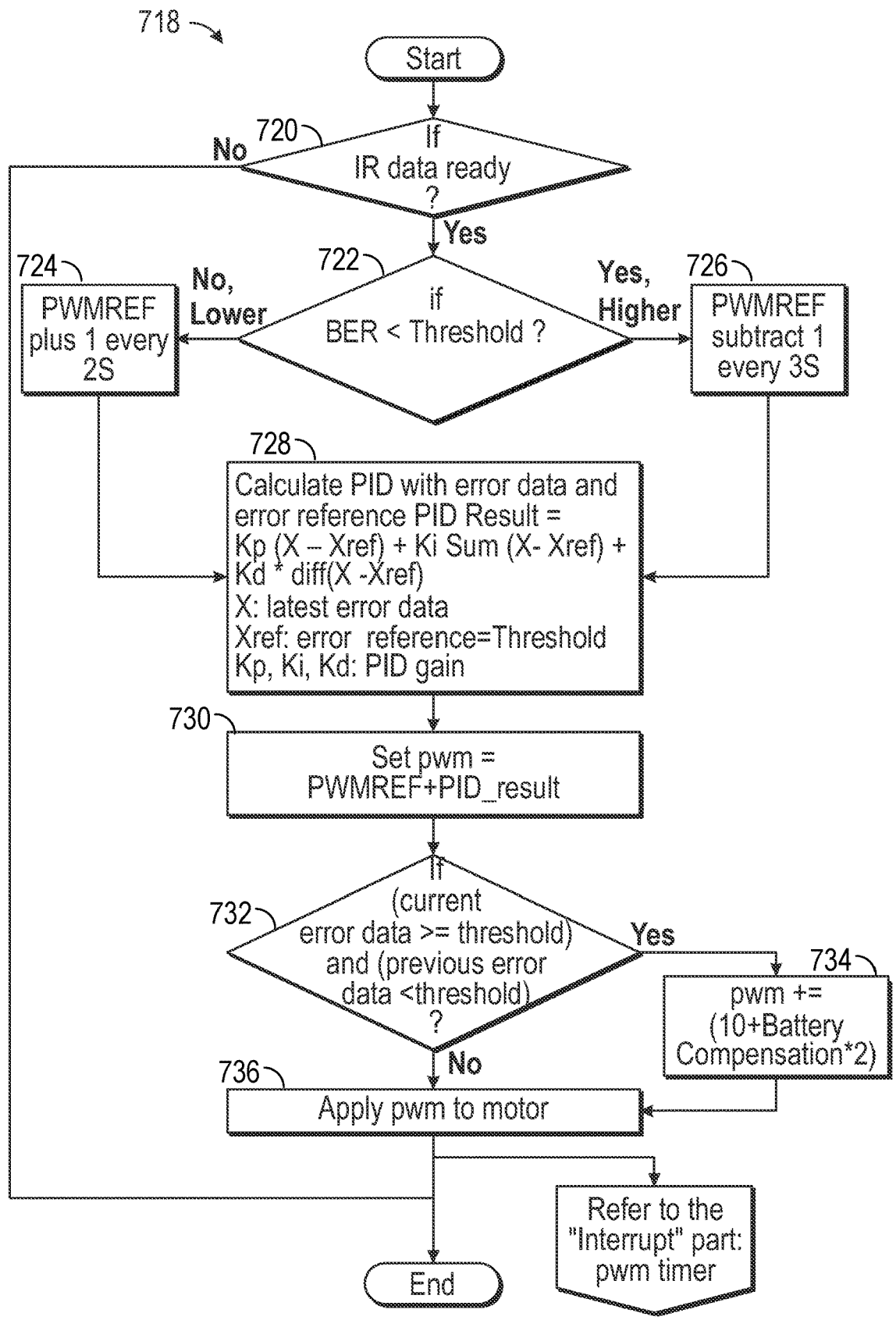
Figure 7C:
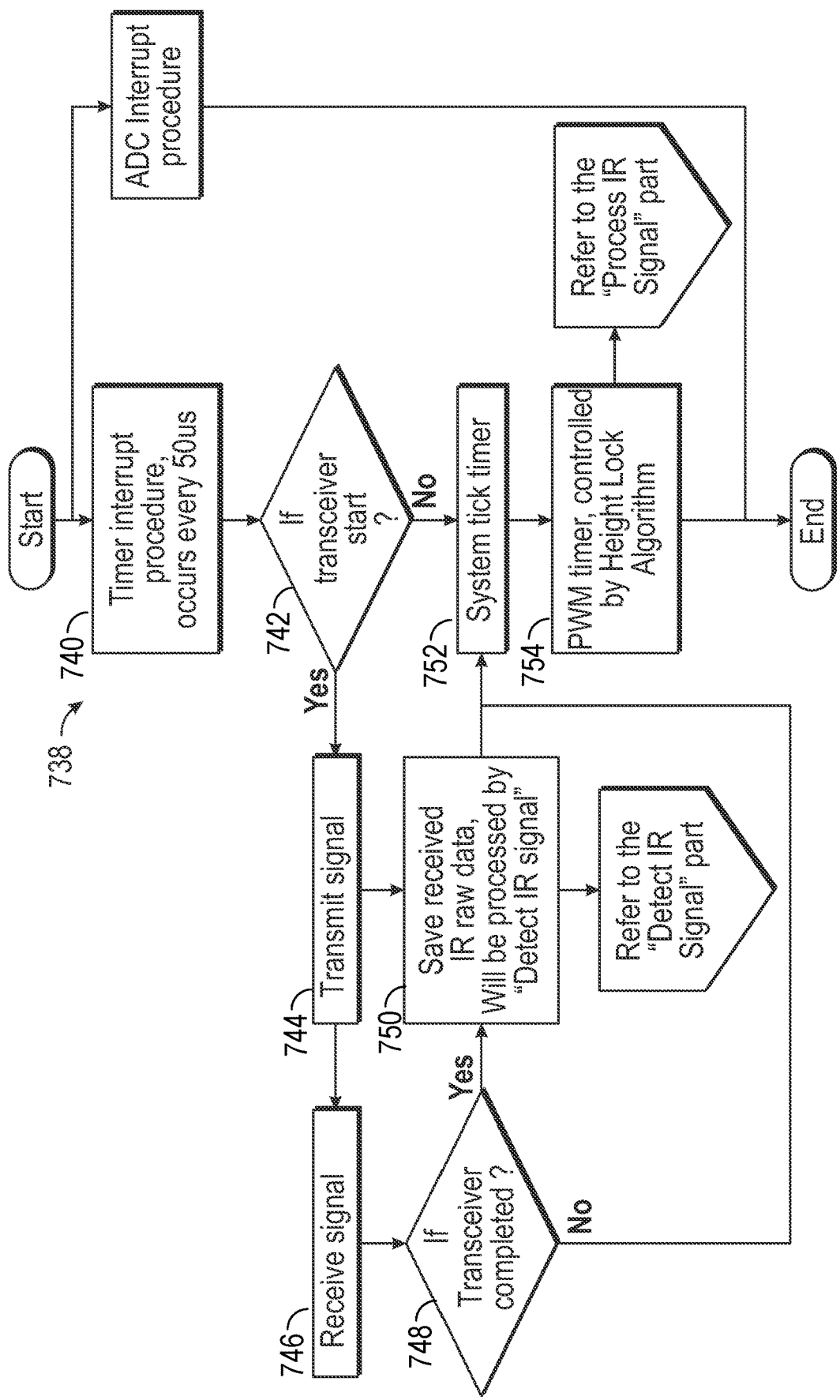

FIGS. 5A-D depict a bit error rate analysis for certain embodiments of the invention;

FIG. 6 depicts a relationship between the bit error rate and distance for certain embodiments of the invention; and FIGS. 7A-C depict exemplary flow charts presenting a process of controlling a flying toy based on transmitting and receiving a digital signal.

The drawing figures do not limit the invention to the specific embodiments disclosed and described herein. The drawings are not necessarily to scale, emphasis instead being placed upon clearly illustrating the principles of the invention.

DETAILED DESCRIPTION

Embodiments of the invention solve the above-described problems and provide a distinct advance in the field by providing a method and system for controlling a flying toy based on a distance between the flying toy and a surface, such as the ground. In some embodiments, the flying toy may transmit a signal that is reflected off of the surface. The signal is then received by a receiver at the flying toy, and the toy is controlled based on information indicative of the received signal. In some embodiments, the distance between the flying toy and the surface may be a height of the flying toy. However, it should be noted that the distance between the flying toy and the surface may be in any direction relative to the flying toy.

In some embodiments, the transmitted signal may be analog such as from a rangefinder emitting a collimated beam of light. The transmitted signal may be sent for a set time that may be referenced as the duration of the transmitted signal. The duration of the transmitted signal may be reduced based on the distance of travel of the transmitted signal. The duration of the return signal may be compared to the duration of the transmitted signal to determine the height of the flying toy. The duration difference between the transmitted signal and the return signal may be indicative of the distance travelled by the signal. Therefore, the height of the flying toy can be determined. Alternatively, a time-of-flight of the signal may be measured. From the time-of-flight, the distance travelled can be determined and therefore, the height can be determined. A control signal may be sent to a motor controlling the output of the motor based on the determined height.

Further, in some embodiments utilizing the analog transmitted signal, when the return signal is not received, the flying toy does not change state. The state of the flying toy prior to not receiving the return signal is maintained. In some embodiments, the control continues based on the determined height prior to loss of the signal. Control of the flying toy when out of range of the transmitted signal is discussed in more detail below.

Alternatively, in some embodiments utilizing a digital transmitted signal, a Bit Error Rate (BER) of the signal can be determined by comparing the received signal to the transmitted signal. When a digital information signal (i.e., a signal including a plurality of bits modulated onto a carrier wave) is transmitted (i.e., sent over a distance), a higher percentage of error occurs the farther the signal travels. Because the BER is proportional to the distance the signal travels, the BER can be used as an indication of the height of the flying toy. The relationship between BER and distance is shown in FIGS. 5A-D and discussed in detail below. In some embodiments, the BER may be represented as a percentage, such as a signal accuracy percentage. When the BER is discussed in embodiments herein, the BER may be represented as the signal accuracy percentage. A control signal may be sent to a motor controlling the output of the motor based on at least one of the determined height (analog embodiment) and the BER (digital embodiment) which may be represented as the signal accuracy percentage. These processes provide systems and methods that overcome the deficiencies in the prior systems described above.

The following description of embodiments of the invention references the accompanying illustrations that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Figure 1:
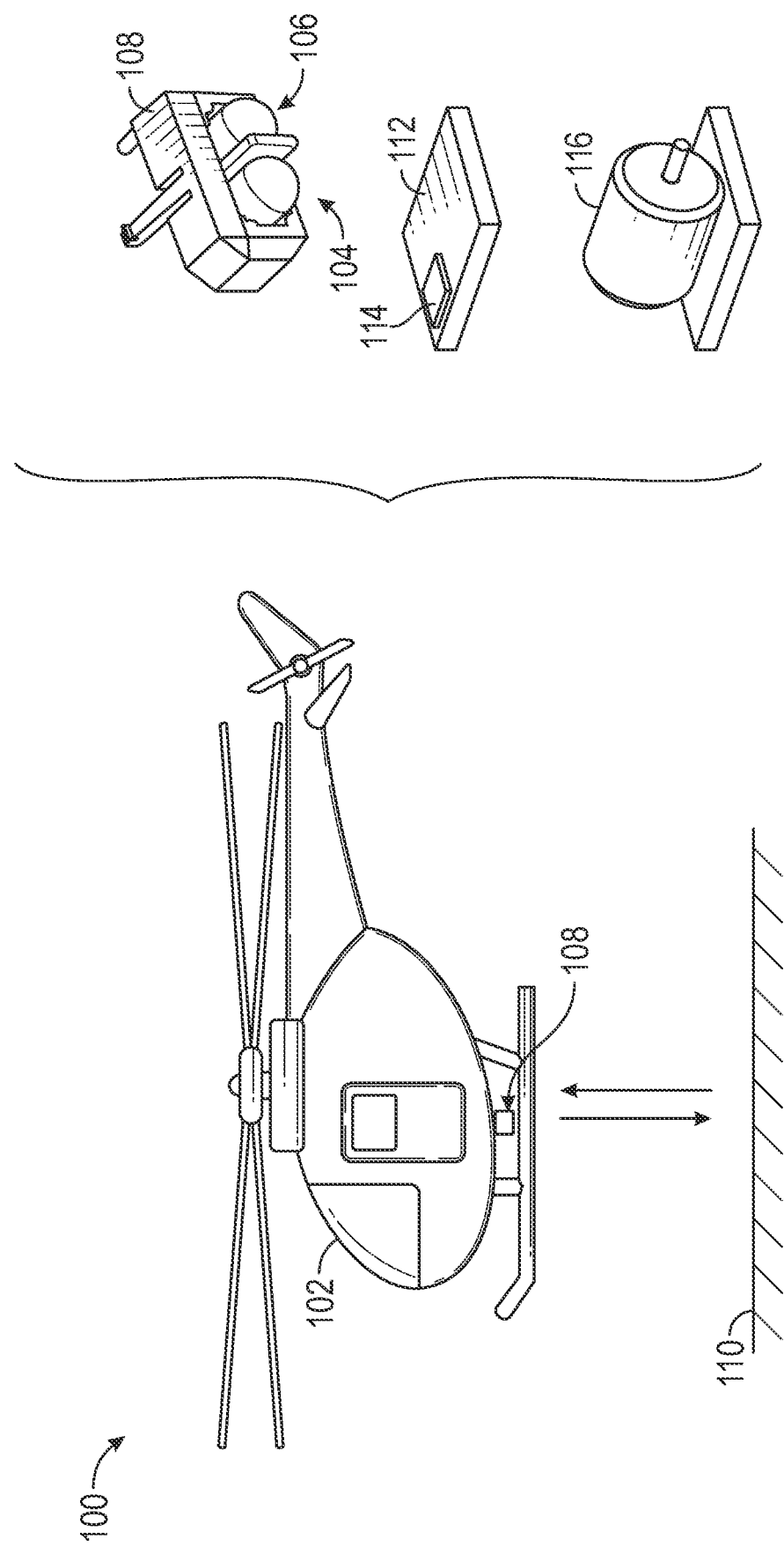
FIG. 1 depicts an exemplary flying toy and hardware for certain embodiments of the invention.

Turning to FIG. 1, an exemplary hardware platform 100 that can form one element of certain embodiments of the invention is depicted. The flying toy 102 may comprise at least one transmitter 104 and at least one receiver 106 represented by the transceiver 108. The transmitter 104 may transmit a transmitted signal and the receiver 106 may receive a return signal as described in embodiments herein. In some embodiments, the return signal may be the transmitted signal reflected off of a surface 110 and returned to the receiver 106. In some embodiments, the surface 110 may be the ground (e.g., floor) or may be any object, such as a table, a hand, carpet, wood, or any other object.

In some embodiments, the signal transmitted from the transmitter 104 is referred to as the transmitted signal. In alternative embodiments described below, the transmitted signal may be analog or digital. When the transmitted signal is reflected off of the surface 110, the transmitted signal is then referred to as the return signal or the received signal once the signal is received by the receiver 106. Because the transmitted signal and the return signal are associated with information indicative of a distance of the toy from the surface, for simplicity, the signal transmitted and returned may generally be referred to as the "signal" in some embodiments described below.

In some embodiments, the received signal may be sent to at least one processor 112, which may be recognized as, or comprise, a controller. Further, the received signal along with any other information from the system may be stored in at least one memory 114 of the at least one processor 112 comprising non-transitory computer-readable media. The at least one processor 112 may execute computer-executable instructions stored on the non-transitory computer-readable media to perform the processes described herein.

The at least one processor 112 may then send a control signal to a motor 116 controlling the motor 116 based on the output from the controller. In some embodiments the control signal is a Pulse Width Modulation (PWM) signal for controlling the motor 116. The motor 116 may be any actuator for controlling the propulsive force of the flying toy 102. The motor 116 may be an electric motor, a fuel-powered motor such as an engine, or any other type of motor. In some embodiments, the propulsive force may be provided by at least one propeller connected to the motor 116. Further, the signal may be adjusted by an intermediate speed controller prior to input at the motor 116.

In some embodiments, the flying toy 102 may be a helicopter as depicted. The flying toy 102 may also be a figurine, an action figure, a stuffed animal, and any other toy that may be equipped with the control system as described in embodiments herein. Further, the flying toy 102 may include toy designs where the propellers are integral to the design of the toy.

In some embodiments, the at least one processor 112 may be in communication with a network and peripheral processors. For example, a computer may be connected to the flying toy 102 by a network. The flying toy 102 may be connected to the computer by either wired or wireless communication. In some embodiments, peripheral inputs, which in some embodiments, may be a joystick, a pad, buttons, a keyboard, and a mouse, are connected wirelessly or by wired communication and may be operable to further control the flying toy 102 or receive information from the flying toy 102. In some embodiments, a user may manipulate the peripheral inputs to control the flying toy 102. Further, in some embodiments, the user may manipulate the peripheral inputs to change settings such as, for example, a prescribed hovering height of the flying toy 102.

Computer-readable media may include both volatile and nonvolatile media, removable and nonremovable media, and contemplate media readable by the at least one memory 114. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Figure 2:
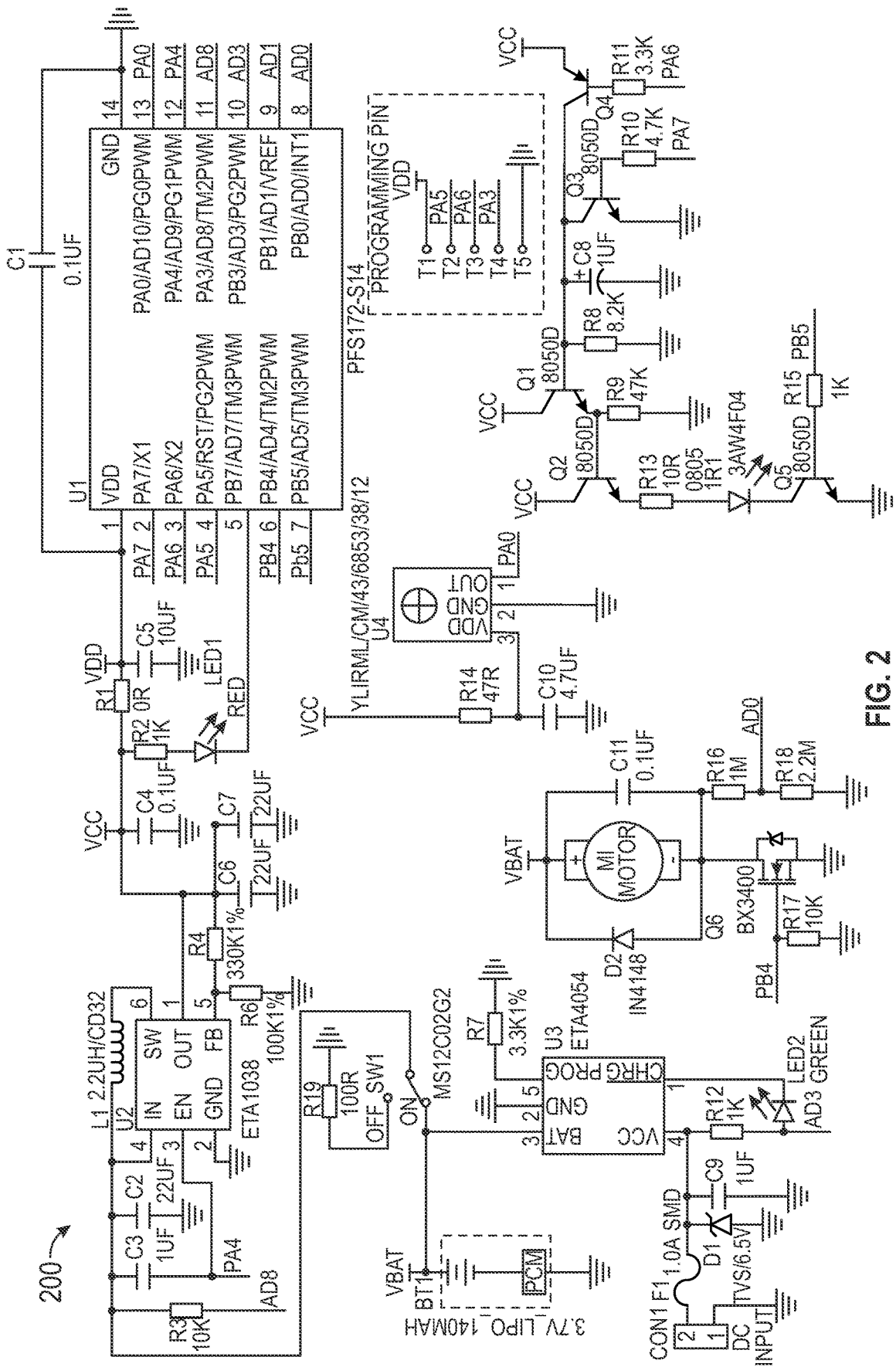
FIG. 2 depicts an exemplary wiring diagram for certain embodiments of the invention.

FIG. 2 depicts an exemplary wiring diagram 200 for embodiments of the invention. The exemplary wiring diagram 200 depicts the electrical component integration that may be used in embodiments as described herein. The exemplary wiring diagram 200 shows how the electrical components may be interconnected to provide a system capable of performing the processes described herein.

Description of the Analog Embodiment

Figure 3:
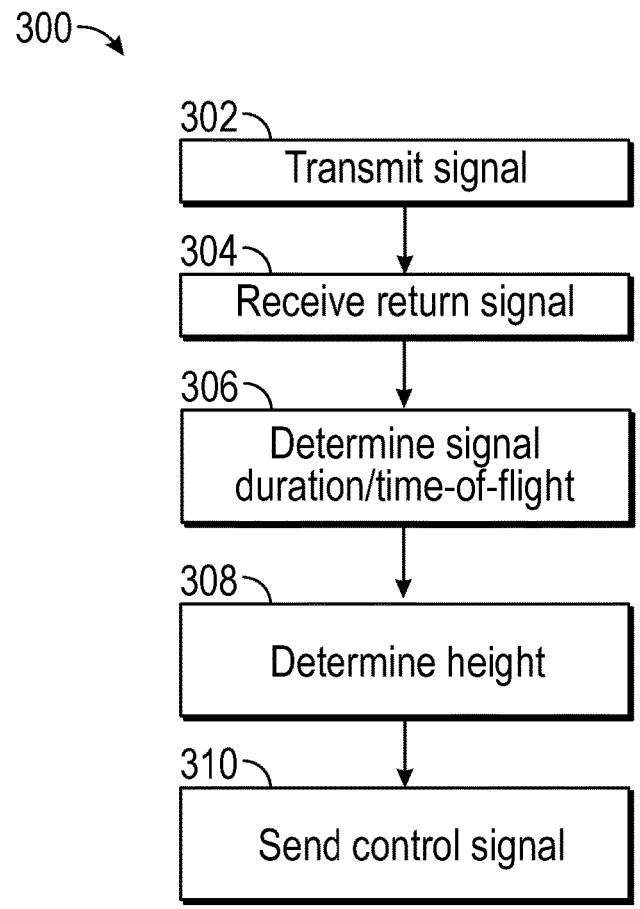
FIG. 3 depicts an exemplary flow chart presenting a process of controlling a flying toy based on transmitting and receiving an analog signal.

FIG. 3 depicts an exemplary process of controlling the flying toy 102 in an analog embodiment generally referenced by the numeral 300. At step 302, the signal is transmitted from the transmitter 104 of the flying toy. In the current exemplary embodiment, the transmitter 104 transmits an analog signal. The analog signal may be transmitted from a rangefinder emitting a collimated beam of light. The signal may be transmitted every second, every few seconds, or less than ever second, and may be emitted for a predetermined period of time. The analog signal may reflect off of the surface 110 and return to the flying toy 102 for processing.

At step 304, the signal is received by the receiver 106 after reflecting off of the surface 110. The received signal may have a shortened duration based on the distance travelled. In some embodiments, a time-of-flight of the signal is recorded for analysis described below.

At step 306, the duration is determined from a comparison of the transmitted signal and the received signal. In some embodiments, the duration may be indicative of the distance between the flying toy 102 and the surface 110. For example, the transmitted signal may be continuous and transmitted for a sample time period. As the signal travels from the transmitter 104 to the surface 110 and back, a portion of the signal may be lost proportional to the distance travelled. This lost signal portion results in the return signal being shorter in duration than the transmitted signal over the sample time period. Because the difference between the duration of the transmitted signal and duration of the return signal is indicative of the distance travelled, the height of the flying toy 102 can be determined.

Alternatively, at step 306 the time-of-flight is used for distance determination. In some embodiments, a time-of-flight of the signal may be used to determine the height of the flying toy 102. The time-of-flight of the signal may be a recorded time from when the transmitted signal is sent to when the reflected signal is received. Because the speed of the signal is known, the distance between the flying toy 102 and the surface 110 may be determined based on the time-of-flight of the signal.

At step 308, the distance between the flying toy 102 and the surface 110 is determined. The height may be determined based on the duration between the transmitted signal and the received signal, or the height may be determined from the time-of-flight of the signal as described above.

At step 310, the control signal is sent to the motor for controlling the height of the flying toy 102. A table of PWM values or a continuous function relating PWM to height may be used to determine a PWM output to be sent to the motor 116. In some embodiments, a difference between the estimated height and a reference height is used to determine a PWM. In some embodiments, a controller outputs the control signal based on the difference between the estimated height and the reference height. The reference height may be a height defined by the user or the flying toy manufacturer and may be the reference height input for control of the flying toy 102.

Further at step 310, if the estimated height is lower than the reference height, a first PWM signal may be transmitted to the motor 116 to increase the height of the flying toy 102. If the estimated height is higher than the reference height, a second PWM signal may be sent to the motor 116 to decrease the height of the flying toy 102. In some embodiments, the motor 116 is connected to a propeller for controlling the height of the flying toy 102.

In some embodiments, when the return signal is not received, the controller maintains the control signal prior to loss of the signal. In the case that the flying toy 102 moves out of detectable range (see FIG. 4), the control signal is not adjusted in any way until the flying toy 102 loses power or the return signal is again detected.

Figure 4:
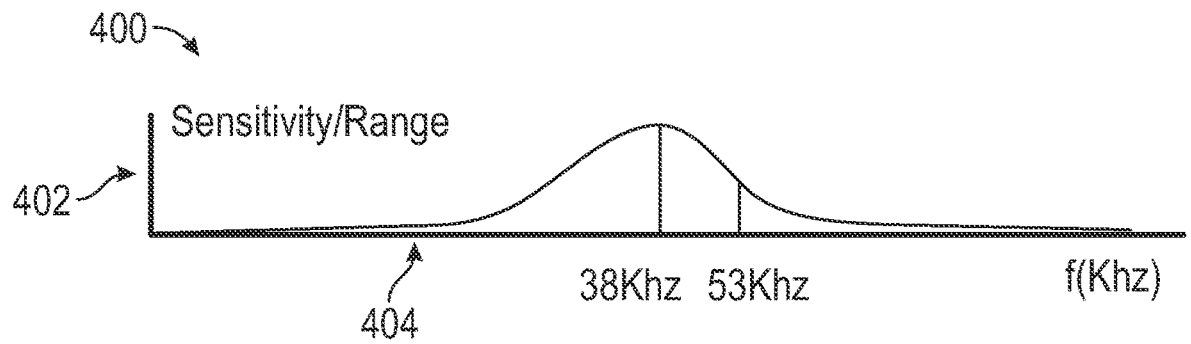
FIG. 4 depicts an exemplary sensitivity range in accordance with embodiments of the invention.

FIG. 4 depicts an exemplary Infrared (IR) receiver frequency response curve in kilohertz generally referenced by the numeral 400. The vertical axis depicts an exemplary sensitivity, or range 402, for the transmitted signal and return signal after reflection. The horizontal axis represents the signal frequency 404, in Kilohertz (Khz). In this example, 38 Khz provides the maximum response, and 53 Khz provides a lower response. However, in the case that the flying toy 102 moves out of range 402, the control signal does not change a state of the motor 116 until the signal is regained.

In some embodiments, the digital PWM may be fixed to provide a reasonable range 402 of reception of the transmitted signal. For example, near the end of the range 402 (i.e., when the flying toy height is greater than the reference height), the control signal may be sent to the motor 116 to reduce the distance between the flying toy 102 and the surface 110.

Description of the Digital Embodiment

As described in embodiments above, the transmitted signal is sent by the transmitter 104 and is a digital signal (e.g., a signal including a plurality of bits modulated onto a carrier wave). In embodiments, the transmitted signal may be either 38 KhZ or 53 Khz as described above. The transmitted signal is reflected off of the surface 110 and returned to the flying toy 102 and received at the receiver 106.

In some embodiments, the flying toy 102 may be controlled by comparing the transmitted signal with the received signal and determining the BER. The transmitted signal may comprise a series of lows (zeros or false readings) and highs (ones or true readings) during flight. When the return signal is received, the number of zeros and ones from the return signal are calculated and compared to the number of zeros and ones from the transmitted signal. In embodiments, the transmitted signal may have a percentage of zeros to ones of between, for example, 39%-100%. The percentage may be referenced as the signal accuracy percentage and is indicative of the distance travelled by the transmitted signal and return signal. In some embodiments, the height determined from the percentage comparison may be used to compare to the reference height using the controllers described herein. In some embodiments, no height is determined and the BER may be used to calculate the PWM control signal using a PID controller.

Figure 5A:
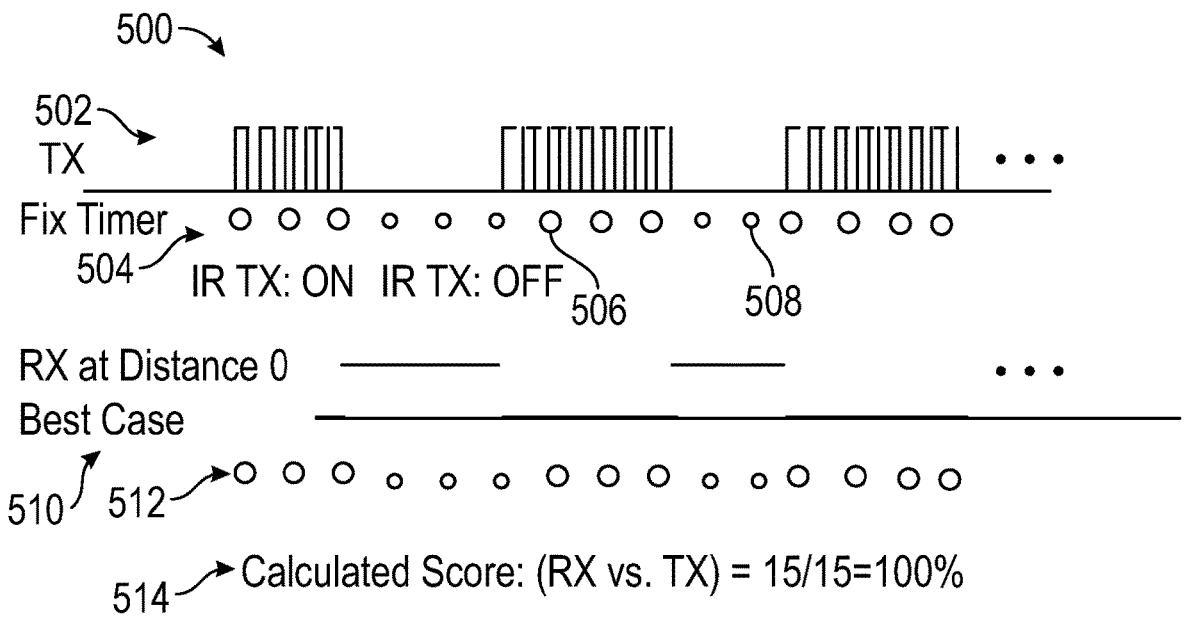

FIGS. 5A-D depict various measurements of BER at a plurality of travelled distances of the signal generally referenced by the numeral 500. The transmitted signal 502 is the series of highs (1s) and lows (0s) described above. The transmitted signal 502 may be sampled at a transmit sample 504 that is a fixed interval. The large circles 506 represent a sampled high and the small circles 508 represent a sampled low. In FIG. 5A, the received signal 510 is reflected from the surface 110 at an exemplary distance of 0. The return sample 512 is sampled at the same interval as the transmit sample 504 rate of the transmitted signal. In this case, because there is no distance between the flying toy 102 and the surface 110, so there is no measured BER. Consequently, the highs and lows from the return signal match the highs and lows sampled from the transmitted signal. Therefore, the calculated score 514 is 100%. Here, the BER is represented as the signal accuracy percentage.

Figure 5B:
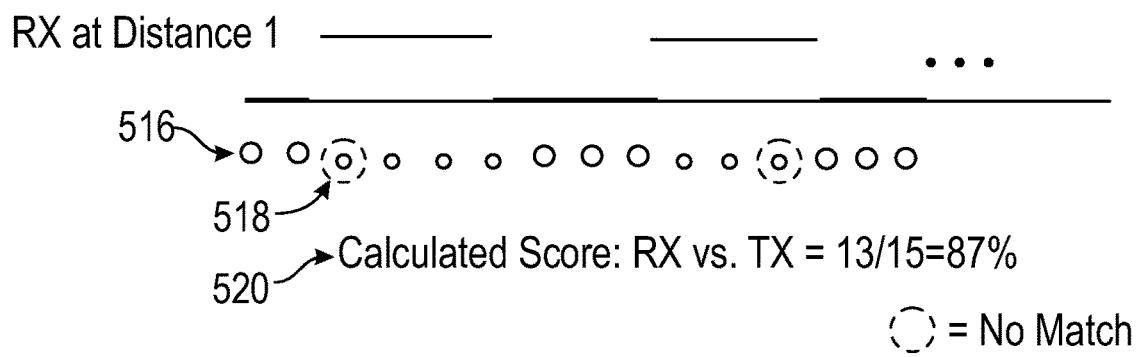

FIG. 5B depicts an exemplary embodiment of the flying toy 102 and the surface 110 separated by an exemplary distance 1. The distance 1 return sample 516 in this case shows that two errors 518 that were highs when transmitted were received as lows. Because there are the two errors 518 in the count, the BER is increased from zero and the distance 1 calculated score 520 signal accuracy percentage is 87%.

Figure 5C:
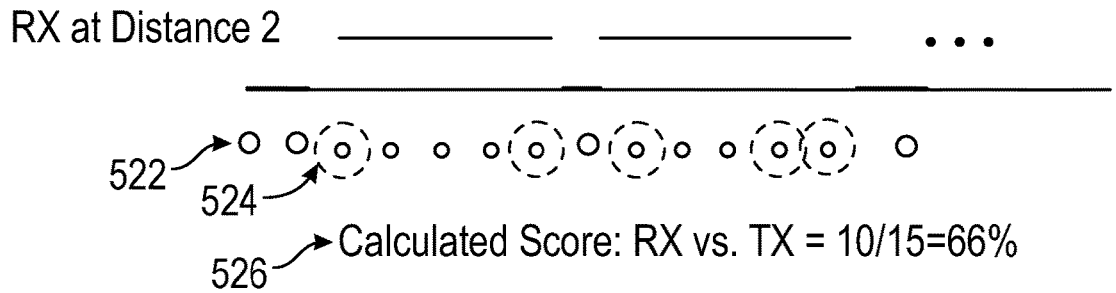

Similarly, FIG. 5C depicts an exemplary embodiment of the flying toy 102 and the surface 110 separated by a distance 2. The distance 2 return signal is again sampled at the same interval as the transmitted signal. In this case, the distance 2 return sample 522 comprises 5 errors 524. The resulting distance 2 calculated score 526 is 66%.

Figure 5D:
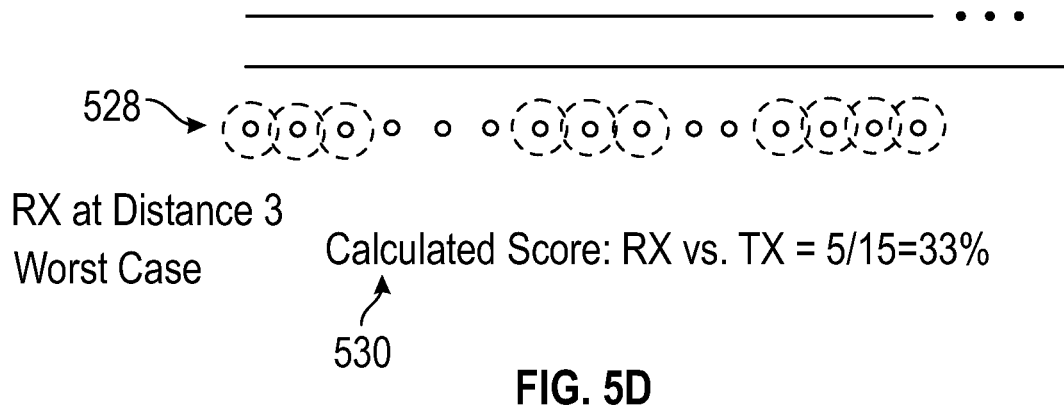

FIG. 5D depicts an exemplary embodiment of the flying toy 102 and the surface 110 separated by a distance 3. The distance 3 return sample 528 does not include highs. Therefore, all of the distance 3 return samples 528 sampled at the fixed interval are lows. The resulting calculated score 530 is 33%. As the transmitted lows also return as lows, there can be no lower score in this case. Therefore, distance 3 is the worst-case scenario for the shown sampling rate.

As shown in FIGS. 5A-D the BER is indicative of the distance between the flying toy 102 and the surface 110. Therefore, the height of the flying toy 102 can be controlled based on the measured BER.

In some embodiments, the relationship between BER and distance is asymptotic. An exemplary asymptotic relationship between BER and distance is shown in FIG. 6 and generally referenced by the numeral 600. The BER is depicted on the vertical axis 602 and distance is depicted on the horizontal axis 604. The BER is indicative of the distance that the transmitted signal has traveled to the surface 110 and back to the flying toy 102. From the determined BER, the distance can then be determined using this asymptotic relationship. Further, the flying toy 102 can be controlled based on the BER. Because the relationship is asymptotic the signal may never be lost but may converge to a percentage of the error between the return bits and the transmitted bits as the numbers of highs reduce to lows as described above. The receiver 106 may always receive some level of the signal. As such, a measure of the height may always be determined, even when the error is high.

FIGS. 7A-C depict an exemplary process for controlling the flying toy 102 based on a transmitted digital signal. FIG. 7A depicts a process for receiving and conditioning the received signal generally reference by numeral 700. The transmitted signal may be sent and received for a designated period of time as shown in the BER samples in FIGS. 5A-D. For example, the signal may be transmitted for a period of 60 milliseconds. The transmitted signal may comprise the series of highs and lows that are received during the designated time frame. At step 702, the signal is received during the designated time frame. If the designated time frame is complete and no signal is received, the process moves to the interrupt mode at step 704. The interrupt mode is shown in FIG. 7C and discussed in detail below.

At step 706, the received signal is analyzed to determine if one cycle of the data is received. If one complete cycle is not received the process moves to the interrupt mode at step 704. If one complete cycle is received then the received signal moves to step 708.

At step 708, a moving average filter may be applied to the received signal to limit or reduce noise effects. The data may be analyzed to calculate the moving average for four and eight data samples. The return signal may be indicative of the height, but noise may be included in the received signal. A moving average filter may be applied to gain a more consistent signal such that the effect of any large noise fluctuations may be reduced, and a single noise fluctuation may not render the entire sample corrupt.

In some embodiments, four samples are averaged and eight samples are averaged. At step 710, the four averaged samples are compared to the eight averaged samples for quality. The larger the number of samples averaged, the more accurate the results. However, the larger the number of samples the more noise that may be introduced. If the value of the four averaged samples is not less than the eight averaged samples, the process moves to step 712. At step 712 the data from the four averaged samples is selected. If the value of the eight averaged samples is less than the four averaged samples, the process moves to step 714 where the data from the eight averaged samples is selected.

When the received signal is conditioned, the process moves to step 716 when the received signal is processed. The signal processing is shown in FIG. 7B and described in detail below.

FIG. 7B depicts a process for processing the received signal for determining a control signal to send to the motor 116 generally referenced by the numeral 718. At step 720, the received signal is analyzed to determine if the received signal has been conditioned as described above. If the received signal is not conditioned, then the process moves to the interrupt mode shown in FIG. 7C and described in detail below. If the received signal has been conditioned, the process moves to step 722.

At step 722, the BER is determined by comparing the received signal with the transmitted signal. The difference between transmitted number bits and the received number of bits is indicative of the distance travelled as described above. Therefore, the BER can be used to control the height of the flying toy 102.

In some embodiments, the BER is compared to a threshold value to control the flying toy 102. The threshold value may be a BER value predetermined for the flying toy 102 to fly at an associated desired height. The reference BER may be selected based on the desired height using the known relationship between BER and distance travelled shown in FIGS. 5A-D and FIG. 6 and described above. Similarly, when the flying toy 102 flies at a desired height, the BER of the received signal compared to the transmitted signal may be at the threshold value. However, the reflectivity of the surface 110 may increase the BER resulting in a lower height than expected.

At step 724, the BER is below the threshold value. Consequently, the BER below the threshold value is indicative of a height below the desired height. As such, a higher PWM reference may be input into the controller at step 726. In some embodiments, the PWM reference value may be increased by one every two seconds when the BER is lower than the threshold value.

At step 726, the BER is above the threshold value. The BER above the threshold is indicative of the flying toy 102 higher than the desired height. Consequently, the PWM reference value may be reduced. As such, a lower PWM reference value may be input into the controller at step 728. In some embodiments, the PWM reference may be reduced by one every three seconds when the BER is higher than the threshold value.

At step 728, the PWM reference generated in step 724 or step 726 is input into the controller. In some embodiments, the controller is a Proportional-Integral-Derivative controller as shown, and the PID result is equivalent to Kp (X−Xref)+Ki Sum (X−Xref)+Kd*diff(X−Xref) where X is the BER, Xref is the threshold value, and Kp, Ki, and Kd are the PID gains. In alternative embodiments, the controller may be any linear controller such as, for example, a Proportional (P) or a Proportional-Derivative (PD). Although linear controllers are discussed herein, any nonlinear, and adaptive controller may be used. Further, any statistical and machine learning algorithms may be added. In this way, the distance between the flying toy 102 and the surface 110 may be linearly or nonlinearly controlled.

As a result of the controller output. When the BER is below the threshold value, a first control signal may be sent to increase the speed or RPM of the motor 116 generating more propulsive force and increasing the height of the flying toy 102. Similarly, when the BER is above the threshold value, the speed of the motor 116 may be reduced by the control signal reducing the height of the flying toy 102. In some embodiments, the motor 116 is an electric motor and the control signal is a PWM.

At step 730, the control signal is generated. In some embodiments, the control signal is equal to the sum of the PWM reference determined above and the PWM controller output.

At step 732, previous BER data may be compared to the current BER data to determine if the battery is low. If the BER is not increasing with increased PWM applied to the motor 116, battery compensation at step 734 may be applied to the PWM control signal at step 736.

FIG. 5C depicts the interrupt mode generally referenced by numeral 738. The interrupt mode is applied at step 704 of FIG. 5A and after step 736 of FIG. 5B. The interrupt mode is applied when a usable signal is not received and the receiving mode times out, when the control signal is sent to the motor 116, and at step 740 when the interrupt mode is initiated every fifty microseconds.

At step 742, if the transceiver 108 (i.e., transmitter 104 and receiver 106) is powered, then the process proceeds to step 744. At step 744, the transmitter 104 emits the transmitted signal. As described above, the transmitted signal is the digital signal including a plurality of bits modulated onto a carrier wave.

At step 746, the receiver 106 receives the reflected signal. At step 748, the received signal is analyzed to determining if the transceiver 108 has received the signal. If the signal has not been received, the process moves to step 752. If the signal has been received, the process moves to step 750. At step 750, the received signal data is stored and conditioned for processing as shown in FIG. 5A and described above. At step 752, the system is moved to the next time step. At step 754, the received and conditioned signal is processed as shown in FIG. 5B and described above.

An exemplary process of controlling the flying toy shown in FIGS. 7A-C above is now described. The transmitter 104 may send a digital signal that is reflected off of the surface 110 and returned to the receiver 106. The received signal may be compared to the transmitted signal to determine the BER. The BER may be compared to a threshold value to determine a PWM reference input to the PID controller. The control signal may then be determined from the sum of the PID output and the PWM reference. The control signal may be sent from the at least one processor 112 (i.e., the controller) to the motor 116 that alters the speed of the motor 116 to change the height of the flying toy 102. If the BER is below the threshold value, the speed of the motor 116 may be increased to increase the height of the flying toy 102, and if the BER is above the threshold value, the speed of the motor 116 may be reduced to decrease the height of the flying toy 102.

In some embodiments, the control signal may comprise three parts, or may be changed based on three conditions. The control signal may change relative to an initial startup control signal. The initial startup control signal may be a designated PWM that starts the motor 116 rotating to propel the flying toy 102 to a designated BER measurement. Second, a control signal adjustment may be made based on power change. As the battery power reduces, the signal may reduce, and a compensation factor may be provided to the control signal. Third, the control signal may be based on the output of the controller as described above.

In some embodiments, the PID output compensates for the flying toy 102 at a BER for a period of time. For example, if the BER is above the threshold value for a given amount of time while the flying toy 102 is operating correctly, the control signal PWM may be reduced slowly to compensate. Similarly, if the BER is lower than the threshold value for a period of time, the control signal PWM may be increased slowly to raise the flying toy 102.

In some embodiments, the controller may be open loop or closed loop. An open loop system may send the control signal to the motor 116 with no feedback from the state of the motor 116 or the propeller. The control may purely be based on the BER determined from the received signal. In the case of closed loop system, the motor 116 and propulsion system receiving the control signal may be monitored and included in a feedback to control the system. Any sensors for measuring the rotation and speed of the motor 116 and rotation and speed of a propeller, or plurality of propellers, or state of the flying toy 102 may be used for feedback.

In some embodiments, as described above, the motor 116 may be connected to the propeller for generating lift to cause the flying toy 102 to hover. In some embodiments, the propeller may be a plurality of propellers connected to the sides, top, and bottom of the flying toy 102. Further, the transmitter 104 and receiver 106 may be positioned on any portion of the flying toy 102 causing the distance to be any translational distance, vertical, horizontal, and any other direction.

Although the invention has been described with reference to the embodiments illustrated in the attached drawing figures, it is noted that equivalents may be employed, and substitutions made herein without departing from the scope of the invention.

Having thus described various embodiments of the invention, what is claimed as new and desired to be protected by Letters Patent includes the following:

1. A method of controlling a flying toy based on a distance between the flying toy and a surface, the method comprising the steps of:
   transmitting a signal from a transmitter at the flying toy;
   receiving the signal at a receiver of the flying toy after the signal has reflected off of the surface;
   comparing the received signal with the transmitted signal;
   determining a bit error rate between the transmitted signal and the received signal; and
   sending a control signal to a motor to control flight of the flying toy, wherein the control signal is a pulse width modulation (PWM) signal and the motor is an electric motor,
   wherein the control signal is based at least in part on the bit error rate and at least in part on a battery compensation factor that is applied when the bit error rate is not increasing with increased PWM applied to the motor.

2. The method of claim 1, wherein a frequency of the transmitted signal is either 38 kilohertz or 53 kilohertz.

3. The method of claim 1, further comprising the step of providing a propulsive force by a propeller connected to the motor to control the distance between the flying toy and the surface, and wherein the distance is a height of the flying toy.

4. The method of claim 1, wherein the control signal is determined by a proportional-integral-derivative controller.

5. The method of claim 1, further comprising the step of performing a moving average of a plurality of samples of the received signal to reduce signal noise effects.

6. The method of claim 1, wherein the bit error rate is indicative of the distance between the flying toy and the surface, and wherein the control signal being based at least in part on the bit error rate comprises the control signal being based on a comparison of the bit error rate to a threshold value.

7. A flying toy control system for controlling a distance between a flying toy and a surface, comprising:
   a transmitter transmitting a signal from the flying toy;
   a receiver receiving the signal at the flying toy after the signal has reflected off of the surface; and
   one or more non-transitory computer-readable media storing computer-executable instruction that, when executed by at least one processor, perform a method of controlling the flying toy at a distance from the surface, the method comprising the steps of:
   comparing the received signal with the transmitted signal;
   determining a bit error rate between the transmitted signal and the received signal; and
   sending a control signal to a motor to control flight of the flying toy, wherein the control signal is a pulse width modulation (PWM) signal and the motor is an electric motor,
   wherein the control signal is based at least in part on the bit error rate and at least in part on a battery compensation factor that is applied when the bit error rate is not increasing with increased PWM applied to the motor.

8. The control system of claim 7, wherein the distance is a height above the surface, wherein the bit error rate is represented as a signal accuracy percentage, and wherein the control signal is based on the signal accuracy percentage.

9. The control system of claim 7, wherein the computer-executable instructions are further executed to perform the step of calculating a moving average of a plurality of samples of the received signal to reduce noise effects.

10. The control system of claim 9, further comprising a propeller for providing a propulsive force based on the control signal to control the distance between the flying toy and the surface, and wherein the distance is a height of the flying toy.

11. The control system of claim 10, wherein the control signal is determined by a proportional-integral-derivative controller.

12. The control system of claim 7, wherein the bit error rate is indicative of the distance between the flying toy and the surface, and wherein the control signal being based at least in part on the bit error rate comprises the control signal being based on a comparison of the bit error rate to a threshold value.

13. One or more non-transitory computer-readable media storing computer-executable instructions that, when executed by at least one processor, perform a method of controlling a flying toy based on a distance between the flying toy and a surface, the method comprising the steps of:
   transmitting a signal from a transmitter at the flying toy;
   receiving the signal at a receiver of the flying toy after the signal has reflected off of the surface;
   determining a bit error rate between the transmitted signal and the received signal;
   sending a control signal to a motor to control flight of the flying toy, wherein the control signal is a pulse width modulation (PWM) signal and the motor is an electric motor, wherein the control signal is based at least in part on the bit error rate and at least in part on a battery compensation factor that is applied when the bit error rate is not increasing with increased PWM applied to the motor.

14. The media of claim 13, wherein the computer-executable instructions are further executable to perform the step of determining a moving average over a plurality of sample times of the received signal.

15. The media of claim 14, wherein the control signal is determined by a proportional-integral-derivative controller and a result of the moving average is input into the proportional-integral-derivative controller.

16. The media of claim 13,
   wherein the motor rotates a propeller for providing a propulsive force based on the control signal to control the distance between the flying toy and the surface, and
   wherein the distance is a height of the flying toy.

17. The media of claim 13, wherein the control signal is determined by a proportional-integral-derivative controller.

18. The media of claim 13,
   wherein the bit error rate is represented as a signal accuracy percentage, and
   wherein the control signal is based on the signal accuracy percentage.

19. The media of claim 13, wherein the bit error rate is indicative of the distance between the flying toy and the surface, and wherein the control signal being based at least in part on the bit error rate comprises the control signal being based on a comparison of the bit error rate to a threshold value.

* * * * *